United States Patent
Yan et al.

(10) Patent No.: US 11,304,236 B2
(45) Date of Patent: Apr. 12, 2022

(54) RANDOM ACCESS METHOD, RANDOM ACCESS RESPONSE METHOD, TERMINAL DEVICE, AND NETWORK DEVICE

(71) Applicant: Huawei Technologies Co., Ltd., Shenzhen (CN)

(72) Inventors: Mao Yan, Chengdu (CN); Lei Chen, Shenzhen (CN); Huang Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/600,279

(22) Filed: Oct. 11, 2019

(65) Prior Publication Data
US 2020/0045748 A1 Feb. 6, 2020

Related U.S. Application Data

(63) Continuation of application No. PCT/CN2018/083009, filed on Apr. 13, 2018.

(30) Foreign Application Priority Data

Apr. 14, 2017 (CN) .......................... 201710245574.9

(51) Int. Cl.
*H04W 74/08* (2009.01)
*H04W 76/11* (2018.01)

(52) U.S. Cl.
CPC ........ *H04W 74/0833* (2013.01); *H04W 76/11* (2018.02)

(58) Field of Classification Search
CPC ..... H04L 5/00; H04W 76/11; H04W 74/0833; H04W 56/0005
See application file for complete search history.

(56) References Cited

U.S. PATENT DOCUMENTS

| 2011/0045837 A1 | 2/2011 | Kim et al. |
| 2016/0338111 A1 | 11/2016 | Han et al. |

(Continued)

FOREIGN PATENT DOCUMENTS

| CN | 101472345 A | 7/2009 |
| CN | 101507148 A | 8/2009 |

(Continued)

OTHER PUBLICATIONS

3GPP TS 38.331 V0.0.1 (Mar. 2017), 3rd Generation Partnership Project; Technical Specification Group Radio Access Network; NR; Radio Resource Control (RRC); Protocol specification (Release 15), 13 pages.

(Continued)

*Primary Examiner* — Mandish K Randhawa
(74) *Attorney, Agent, or Firm* — Slater Matsil, LLP

(57) ABSTRACT

This application discloses a random access method; the random access method includes: sending a random access preamble to a network device; receiving a random access response from the network device according to a random access radio network temporary identifier (RA-RNTI); wherein: the RA-RNTI is related to a group index of a random access occasion group to which a random access occasion of the random access preamble belongs. This application further discloses a corresponding random access response method, terminal device, and network device.

20 Claims, 10 Drawing Sheets

(56) References Cited

U.S. PATENT DOCUMENTS

2017/0006642 A1 1/2017 Park et al.
2018/0077645 A1* 3/2018 Yan .................. H04W 52/0219
2018/0279380 A1* 9/2018 Jung ................ H04W 56/0005

FOREIGN PATENT DOCUMENTS

| CN | 106416115 A | 2/2017 |
| --- | --- | --- |
| EP | 2264936 A2 | 12/2010 |
| EP | 2575283 A1 | 4/2013 |
| KR | 20160110396 A | 9/2016 |
| WO | 2015053553 A1 | 4/2015 |

OTHER PUBLICATIONS

R1-161234 ZTE, "WF on NB-RS for NB-IoT", 3GPP TSG RAN WG1 #84 meeting, St. Julian, Malta, Feb. 15- 19, 2016, 3 pages.
NTT Docomo, Inc. "Discussion on 4-step random access procedure for NR", 3GPP TSG RAN WG1 Meeting #88 R1-1702831, Athens, Greece, Feb. 13-17, 2017, 10 pages.
Samsung "NB M2M—Discussions of Random Access Design", 3GPP TSG GERAN #66 GP-150380,Vilnius, Lithuania, May 25-29, 2015, 3 pages.

\* cited by examiner

RANDOM ACCESS METHOD, RANDOM ACCESS RESPONSE METHOD, TERMINAL DEVICE, AND NETWORK DEVICE

CROSS-REFERENCE TO RELATED APPLICATIONS

This application is a continuation of International Application No. PCT/CN2018/083009, filed on Apr. 13, 2018 which claims priority to Chinese Patent Application No. 201710245574.9 filed on Apr. 14, 2017. The disclosures of the aforementioned applications are hereby incorporated by reference in their entireties.

TECHNICAL FIELD

The present invention relates to the field of communications technologies, and in particular, to a random access method, a random access response method, a terminal device, and a network device.

BACKGROUND

A beamforming technology can be used to improve communication efficiency and obtain a larger network capacity, but also poses a challenge to a system design. Because energy for transmitting a signal is limited in an area, a plurality of beams are required to implement full-range coverage. In addition, quantities, load, service requirements, and the like of terminal devices (UE) at different geographical locations are different. Therefore, different quantities of beams and resources may be required in different areas.

Before a network device communicates with a terminal device, downlink synchronization and uplink synchronization first need to be performed. During downlink synchronization, the network device sends a downlink synchronization signal by using a plurality of transmit beams. The terminal device receives and detects the downlink synchronization signal by using one or more receive beams, to obtain a downlink transmit and receive beam pair, a time, and system information. Uplink synchronization is completed by using a random access process. The terminal device first sends a random access signal. The network device detects the random access signal, to obtain an optimal uplink transmit and receive beam pair, an uplink time, and the like, and finally implement uplink synchronization between the network device and the terminal device.

FIG. 1 is a schematic flowchart of a random access (Random access, RA) process and random access resource configuration in the current system. For example, in long term evolution (LTE), during random access, UE first performs downlink synchronization to obtain main system information such as a system frame number from a physical broadcast channel (PBCH), and then receives other downlink system information. Parameter configuration of random access is obtained from a system information block 2 (SIB2). Random access configuration information specifies a time, a frequency, and a random access preamble that can be used by the UE to send random access. Then, the UE generates a random access preamble (MSG 1) based on the random access configuration information, and sends the random access preamble in a corresponding time on a corresponding frequency. In LTE, during random access, the terminal device and the network device correspond to one random access radio network temporary identifier (RA-RNTI) at a time-frequency location in which a random access resource is located. The network device detects a received signal, and if detecting a preamble sequence, the network device generates a random access response corresponding to the preamble sequence. Preambles detected at a same random access time-frequency resource location are responded to by using a same message 2 (MSG 2). The message 2 is transmitted by using a physical downlink shared channel (PDSCH), and a physical downlink control channel (PDCCH) corresponding to the channel is identified by using an RA-RNTI. After the UE sends a random access preamble, in a time window specified by the downlink system information of the network device, the UE listens on the physical downlink control channel by using a corresponding RA-RNTI. If receiving the physical downlink control channel identified by using the RA-RNTI, the UE decodes the message 2 at a time-frequency location indicated by the physical downlink control channel, that is, receives the random access response, and then proceeds to a subsequent process.

As described above, quantities, load, service requirements, and the like of UEs at different geographical locations are different. As shown in FIG. 2a that is a schematic diagram in which different downlink signals are associated with different quantities of random access resources in terms of time, in some beams of a network, there may be a large quantity of terminal devices or the terminal devices have high load or many service requirements, and in some beams of the network, there may be a small quantity of terminal devices or the terminal devices have low load or few service requirements. Therefore, some downlink signals may be associated with large quantities of random access resources, and some downlink signals may be associated with small quantities of random access resources. Alternatively, as shown in FIG. 2b that is a schematic diagram in which one terminal device performs random access on random access resources associated with a plurality of downlink signals. Because one terminal device may receive a plurality of downlink signals, the terminal device may initiate random access on random access resources associated with the plurality of downlink signals. In this case, as shown in FIG. 2a, a downlink signal 1 is associated with a plurality of random access resources in terms of time, and if an LTE manner is used, random access responses sent by using a same downlink transmit beam need to be separately encapsulated into two messages 2 and identified by using two RA-RNTIs. Alternatively, as shown in FIG. 2b, one terminal needs to perform uplink access on random access resources associated with two downlink signals, and if an LTE manner is used, random access signals sent by the terminal on two random access resources need to be separately responded to on two time-frequency resources, or the terminal needs to listen to two possible responses that are identified by using two RA-RNTIs. This random access and response manner causes a waste of communication resources, and also causes low efficiency of the random access process.

SUMMARY

This application provides a random access method, a random access response method, a terminal device, and a network device, to save communication resources and improve efficiency of a random access process.

An aspect of this application provides a random access method, where the method includes: sending, to a network device, at least one random access preamble on a plurality of random access resources associated with one downlink/uplink signal or one downlink/uplink signal group, where the plurality of random access resources correspond to one random access radio network temporary identifier; and receiving a random access response from the network device, where the random access response is a response to the at least one random access preamble. In this implementation, a joint response is made to one or more random access preambles on a plurality of random access resources associated with one downlink/uplink signal or one downlink/uplink signal group, thereby saving communication resources and improving efficiency of a random access process.

In a possible implementation, before the receiving a random access response from the network device, the method further includes: receiving downlink control information sent by the network device, where the downlink control information is used to indicate a frequency and demodulation information of the random access response, and the downlink control information is scrambled by using the random access radio network temporary identifier; and descrambling the downlink control information by using the random access radio network temporary identifier, to obtain the frequency and the demodulation information of the random access response; and the receiving a random access response from the network device includes: receiving the random access response based on the frequency of the random access response, and demodulating the random access response based on the demodulation information.

In another possible implementation, the plurality of random access resources are different in at least one of the following features: a time, a frequency, and a random access preamble sequence.

In still another possible implementation, the random access radio network temporary identifier may be determined by using a combination of the following parameters: an index number of the downlink/uplink signal and a first specified constant. Further, the random access radio network temporary identifier may be determined by using an initial value of the random access radio network temporary identifier, the index number of the downlink/uplink signal, and the first specified constant. For example, the random access radio network temporary identifier RA-RNTI may be a function of an index of a downlink signal, that is, RA-RNTI=RNTI_0+mod(blk_id, K), where RNTI_0≥1, and RNTI_0 is a positive integer and is the initial value of the random access radio network temporary identifier, blk_id is the index of the downlink/uplink signal, and K is the first specified constant.

In still another possible implementation, the random access radio network temporary identifier may be determined by using a combination of the following parameters: an index number of the downlink/uplink signal group and a second specified constant. Further, the random access radio network temporary identifier may be determined by using an initial value of the random access radio network temporary identifier, the index number of the downlink/uplink signal group, and the second specified constant. For example, the RA-RNTI may be a function of an index of a signal group, that is, RA-RNTI=RNTI_0+mod(bst_id, N), where RNTI_0≥1, and RNTI_0 is a positive integer and is the initial value of the random access radio network temporary identifier, bst_id is the index of the downlink/uplink signal group, and N is the second specified constant.

In still another possible implementation, the random access radio network temporary identifier may be determined by using a combination of the following parameters: an index number of the downlink/uplink signal, a first specified constant, an index number of the downlink/uplink signal group, and a second specified constant. Further, the random access radio network temporary identifier may be determined by using an initial value of the random access radio network temporary identifier, the index number of the downlink/uplink signal, the first specified constant, the index number of the downlink/uplink signal group, and the second specified constant. For example, the RA-RNTI may be a function of an index of a signal and an index of a signal group, that is, RA-RNTI=RNTI_0+mod(blk_id, K)+K×mod(bst_id, N), where RNTI_0≥1, and RNTI_0 is a positive integer and is the initial value of the random access radio network temporary identifier, blk_id the index of the downlink/uplink signal, bst_id is the index of the downlink/uplink signal group, and K is the first specified constant, and N is the second specified constant.

In still another possible implementation, the random access radio network temporary identifier may be determined by using a combination of the following parameters: an index number of the downlink/uplink signal, a first specified constant, an index number of the downlink/uplink signal group, a second specified constant, an index number of a signal time, and a third specified constant. Further, the random access radio network temporary identifier may be determined by using an initial value of the random access radio network temporary identifier, the index number of the downlink/uplink signal, the first specified constant, the index number of the downlink/uplink signal group, the second specified constant, the index number of the signal time, and the third specified constant. For example, the RA-RNTI may be a function of an index of a signal time, an index of a signal, and an index of a signal group, that is, RA-RNTI=RNTI_0+mod(blk_id, K)+K×mod(bst_id, N)+K×N×mod(t_id, T), where RNTI_0≥1, and RNTI_0 is a positive integer and is the initial value of the random access radio network temporary identifier, blk_id is the index of the downlink/uplink signal, bst_id is the index of the downlink/uplink signal group, t_id is the index of the signal time, K is the first specified constant, N is the second specified constant, and T is the third specified constant.

In still another possible implementation, the random access radio network temporary identifier may be determined by using a combination of the following parameters: an index number of the downlink/uplink signal, a first specified constant, an index number of the downlink/uplink signal group, a second specified constant, an index number of a signal time, a third specified constant, an index value of a frequency signal, and a fourth specified constant. Further, the random access radio network temporary identifier may be determined by using an initial value of the random access radio network temporary identifier, the index number of the downlink/uplink signal, the first specified constant, the index number of the downlink/uplink signal group, the second specified constant, the index number of the signal time, the third specified constant, the index value of the frequency signal, and the fourth specified constant. For example, the RA-RNTI may be a function of an index of a signal time, an index of a signal frequency, an index of a signal, and an index of a signal group, that is, RA-RNTI=RNTI_0+mod(blk_id, K)+K×mod(bst_id, N)+K×N×mod(t_id, T)+K×N×T×mod(f_id, F), where RNTI_0≥1, and RNTI_0 is a positive integer and is the initial value of the random access radio network temporary identifier, blk_id is the index of the downlink/uplink signal, bst_id is the index of the downlink/uplink signal group, t_id is the index of the signal time, f_id is the index of the signal frequency, K is the first specified constant, N is the second specified constant, T is the third specified constant, and F is the fourth specified constant.

In the foregoing implementations, a plurality of manners of determining the random access radio network temporary identifier are described. Because one or more random access preambles on a plurality of random access resources associated with one downlink signal or one downlink signal group correspond to one random access radio network temporary identifier, the random access radio network temporary identifier is related to an uplink/downlink signal or an uplink/downlink signal group, and a signal time and a signal frequency for sending an uplink/downlink signal.

In still another possible implementation, the first specified constant is any integer between 1 and 64 (including 1 and 64), the second specified constant is any integer between 1 and 32 (including 1 and 32), the third specified constant is any integer between 2 and 20 (including 2 and 20), and the fourth specified constant is any integer between 2 and 20 (including 2 and 20). In this implementation, a value range of a specified constant used in a process of determining the random access radio network temporary identifier is provided.

In still another possible implementation, before the sending, to a network device, at least one random access preamble on a plurality of random access resources associated with one downlink/uplink signal or one downlink/uplink signal group, the method further includes: selecting, based on a group to which the plurality of random access resources belong or a group to which the at least one random access preamble belongs, a parameter combination for determining the random access radio network temporary identifier. In this implementation, a basis for selecting a parameter combination for determining the random access radio network temporary identifier is described.

In still another possible implementation, in all the foregoing embodiments, when the random access radio network temporary identifier is calculated, locations of any two of blk_id, bst_id, t_id, and f_id may be exchanged, and correspondingly, locations of K, N, T, and F need to be exchanged.

In still another possible implementation, the first specified constant, the second specified constant, the third specified constant, the fourth specified constant, and RNTI_0 are determined based on system information, or are fixed values.

Values of RNTI_0, the first specified constant, the second specified constant, the third specified constant, and the fourth specified constant ensure that within a same time, different random access is different from each other, and random access and another signal/channel are different from each other.

Another aspect of this application provides a terminal device. The terminal device has a function of implementing behavior of the terminal device in the foregoing method. The function may be implemented by using hardware, or may be implemented by executing corresponding software by hardware. The hardware or the software includes one or more modules corresponding to the function.

In a possible implementation, the terminal device includes: a sending unit, configured to send, to a network device, at least one random access preamble on a plurality of random access resources associated with one downlink/uplink signal or one downlink/uplink signal group, where the plurality of random access resources correspond to one random access radio network temporary identifier; and a receiving unit, configured to receive a random access response from the network device, where the random access response is a response to the at least one random access preamble.

In another possible implementation, the terminal device includes a receiver, a transmitter, a memory, and a processor. The memory stores a group of program code, and the processor is configured to invoke the program code stored in the memory to perform the following operations: controlling the transmitter to send, to a network device, at least one random access preamble on a plurality of random access resources associated with one downlink/uplink signal or one downlink/uplink signal group, where the plurality of random access resources correspond to one random access radio network temporary identifier; and controlling the receiver to receive a random access response from the network device, where the random access response is a response to the at least one random access preamble.

Based on a same concept, for problem resolving principles and beneficial effects of the apparatus, refer to the foregoing possible method implementations of the terminal device and the brought beneficial effects. Therefore, for implementation of the apparatus, refer to the implementation of the method. Details are not repeated herein.

Still another aspect of this application provides a random access response method, where the method includes: receiving, from at least one terminal device, at least one random access preamble on a plurality of random access resources associated with one downlink/uplink signal or one downlink/uplink signal group, where the plurality of random access resources correspond to one random access radio network temporary identifier; and sending a random access response to the at least one terminal device, where the random access response is a response to the at least one random access preamble. In this implementation, a joint response is made to one or more random access preambles on a plurality of random access resources associated with one downlink/uplink signal or one downlink/uplink signal group, thereby saving communication resources and improving efficiency of a random access process.

In a possible implementation, the plurality of random access resources are different in at least one of the following features: a time, a frequency, and a random access preamble sequence.

In another possible implementation, the random access radio network temporary identifier may be determined by using a combination of the following parameters: an index number of the downlink/uplink signal and a first specified constant. Further, the random access radio network temporary identifier may be determined by using an initial value of the random access radio network temporary identifier, the index number of the downlink/uplink signal, and the first specified constant. For example, the random access radio network temporary identifier RA-RNTI may be a function of an index of a downlink signal, that is, RA-RNTI=RNTI_0+mod(blk_id, K), where RNTI_0≥1, and RNTI_0 is a positive integer and is the initial value of the random access radio network temporary identifier, blk_id is the index of the downlink/uplink signal, and K is the first specified constant.

In another possible implementation, the random access radio network temporary identifier may be determined by using a combination of the following parameters: an index number of the downlink/uplink signal group and a second specified constant. Further, the random access radio network temporary identifier may be determined by using an initial value of the random access radio network temporary identifier, the index number of the downlink/uplink signal group, and the second specified constant. For example, the RA-RNTI may be a function of an index of a signal group, that is, RA-RNTI=RNTI_0+mod(bst_id, N), where RNTI_0≥1, and RNTI_0 is a positive integer and is the initial value of the random access radio network temporary identifier, bst_id is the index of the downlink signal group or the uplink signal group, and N is the second specified constant.

In another possible implementation, the random access radio network temporary identifier may be determined by using a combination of the following parameters: an index number of the downlink/uplink signal, a first specified constant, an index number of the downlink/uplink signal group, and a second specified constant. Further, the random access radio network temporary identifier may be determined by using an initial value of the random access radio network temporary identifier, the index number of the downlink/uplink signal, the first specified constant, the index number of the downlink/uplink signal group, and the second specified constant. For example, the RA-RNTI may be a function of an index of a signal and an index of a signal group, that is, RA-RNTI=RNTI_0+mod(blk_id, K)+K×mod(bst_id, N), where RNTI_0≥1, and RNTI_0 is a positive integer and is the initial value of the random access radio network temporary identifier, blk_id the index of the signal, bst_id is the index of the signal group, and K is the first specified constant, and N is the second specified constant.

In another possible implementation, the random access radio network temporary identifier may be determined by using a combination of the following parameters: an index number of the downlink/uplink signal, a first specified constant, an index number of the downlink/uplink signal group, a second specified constant, an index number of a signal time, and a third specified constant. Further, the random access radio network temporary identifier may be determined by using an initial value of the random access radio network temporary identifier, the index number of the downlink/uplink signal, the first specified constant, the index number of the downlink/uplink signal group, the second specified constant, the index number of the signal time, and the third specified constant. For example, the RA-RNTI may be a function of an index of a signal time, an index of a signal, and an index of a signal group, that is, RA-RNTI=RNTI_0+mod(blk_id, K)+K×mod(bst_id, N)+K×N×mod(t_id, T), where RNTI_0≥1, and RNTI_0 is a positive integer and is the initial value of the random access radio network temporary identifier, blk_id is the index of the signal, bst_id is the index of the signal group, t_id is the index of the signal time, K is the first specified constant, N is the second specified constant, and T is the third specified constant.

In another possible implementation, the random access radio network temporary identifier may be determined by using a combination of the following parameters: an index number of the downlink/uplink signal, a first specified constant, an index number of the downlink/uplink signal group, a second specified constant, an index number of a signal time, a third specified constant, an index value of a frequency signal, and a fourth specified constant. Further, the random access radio network temporary identifier may be determined by using an initial value of the random access radio network temporary identifier, the index number of the downlink/uplink signal, the first specified constant, the index number of the downlink/uplink signal group, the second specified constant, the index number of the signal time, the third specified constant, the index value of the frequency signal, and the fourth specified constant. For example, the RA-RNTI may be a function of an index of a signal time, an index of a signal frequency, an index of a signal, and an index of a signal group, that is, RA-RNTI=RNTI_0+mod(blk_id, K)+K×mod(bst_id, N)+K×N×mod(t_id, T)+K×N×T×mod(f_id, F), where RNTI_0≥1, and RNTI_0 is a positive integer and is the initial value of the random access radio network temporary identifier, blk_id is the index of the signal, bst_id is the index of the signal group, t_id is the index of the signal time, f_id is the index of the signal frequency, K is the first specified constant, N is the second specified constant, T is the third specified constant, and F is the fourth specified constant.

In the foregoing implementations, a plurality of manners of determining the random access radio network temporary identifier are described. Because one or more random access preambles on a plurality of random access resources associated with one downlink signal or one downlink signal group correspond to one random access radio network temporary identifier, the random access radio network temporary identifier is related to an uplink/downlink signal or an uplink/downlink signal group, and a signal time and a signal frequency for sending an uplink/downlink signal.

In another possible implementation, the first specified constant is any integer between 1 and 64 (including 1 and 64), the second specified constant is any integer between 1 and 32 (including 1 and 32), the third specified constant is any integer between 2 and 20 (including 2 and 20), and the fourth specified constant is any integer between 2 and 20 (including 2 and 20). In this implementation, a value range of a specified constant used in a process of determining the random access radio network temporary identifier is provided.

In another possible implementation, before the sending a random access response to the at least one terminal device, the method further includes: selecting, based on a group to which the plurality of random access resources belong or a group to which the at least one random access preamble belongs, a parameter combination for determining the random access radio network temporary identifier. In this implementation, a basis for selecting a parameter combination for determining the random access radio network temporary identifier is described.

Still another aspect of this application provides a network device. The network device has a function of implementing behavior of the network device in the foregoing method. The function may be implemented by using hardware, or may be implemented by executing corresponding software by hardware. The hardware or the software includes one or more modules corresponding to the function.

In a possible implementation, the network device includes: a receiving unit, configured to receive, from at least one terminal device, at least one random access preamble on a plurality of random access resources associated with one downlink/uplink signal or one downlink/uplink signal group, where the plurality of random access resources correspond to one random access radio network temporary identifier; and a sending unit, configured to send a random access response to the at least one terminal device, where the random access response is a response to the at least one random access preamble.

In another possible implementation, the network device includes a receiver, a transmitter, a memory, and a processor. The memory stores a group of program code, and the processor is configured to invoke the program code stored in the memory to perform the following operations: controlling the receiver to receive, from at least one terminal device, at least one random access preamble on a plurality of random access resources associated with one downlink/uplink signal or one downlink/uplink signal group, where the plurality of random access resources correspond to one random access radio network temporary identifier; and controlling the transmitter to send a random access response to the at least one terminal device, where the random access response is a response to the at least one random access preamble.

Based on a same concept, for problem resolving principles and beneficial effects of the apparatus, refer to the foregoing possible method implementations of the network device and the brought beneficial effects. Therefore, for implementation of the apparatus, refer to the implementation of the method. Details are not repeated herein.

Still another aspect of this application provides a computer readable storage medium. The computer readable storage medium stores an instruction. When the instruction is run on a computer, the computer is enabled to perform the methods in the foregoing aspects.

Still another aspect of this application provides a computer program product that includes an instruction. When the computer program product is run on a computer, the computer is enabled to perform the methods in the foregoing aspects.

BRIEF DESCRIPTION OF THE DRAWINGS

To describe the technical solutions in the embodiments of the present invention or in the background, the following describes the accompanying drawings required for describing the embodiments of the present invention or the background.

DETAILED DESCRIPTION OF ILLUSTRATIVE EMBODIMENTS

The following describes the embodiments of the present invention with reference to the accompanying drawings in the embodiments of the present invention.

A communications system in the embodiments of the present invention includes a network device and a terminal device. The communications system may be a global system for mobile communications (Global System for Mobile Communications, GSM), a code division multiple access (Code Division Multiple Access, CDMA) system, a wideband code division multiple access (Wideband Code Division Multiple Access, WCDMA) system, a worldwide interoperability for microwave access (Worldwide Interoperability for Microwave Access, WiMAX) system, a long term evolution (Long Term Evolution, LTE) system, a 5G communications system (for example, a new radio (new radio, NR) system, a communications system integrating a plurality of communications technologies (for example, a communications system integrating an LTE technology and an NR technology), or a subsequent evolved communications system.

The terminal device in this application is a device with a wireless communication function, and may be a handheld device with a wireless communication function, an in-vehicle device, a wearable device, a computing device, another processing device connected to a wireless modem, or the like. Terminal devices in different networks may have different names, for example, user equipment (UE), an access terminal, a subscriber unit, a subscriber station, a mobile station, a mobile console, a remote station, a remote terminal, a mobile device, a user terminal, a terminal, a wireless communications device, a user agent or a user apparatus, a cellular phone, a cordless phone, a session initiation protocol (SIP) phone, a wireless local loop (WLL) station, a personal digital assistant (PDA), and a terminal device in a 5G network or a future evolved network.

The network device in this application is a device that is deployed in a radio access network to provide a wireless communication function, and includes but is not limited to a base station (for example, a BTS (BTS), a NodeB (NB), an evolved NodeB (eNB or eNodeB), a transmission node or a transmission reception point (TRP or TP) or a next-generation NodeB (gNB) in an NR system, or a base station or a network device in a future communications network), a relay node, an access point, an in-vehicle device, a wearable device, a wireless fidelity (Wi-Fi) station, a wireless backhaul node, a small cell, a micro base station, or the like.

Figure 3:
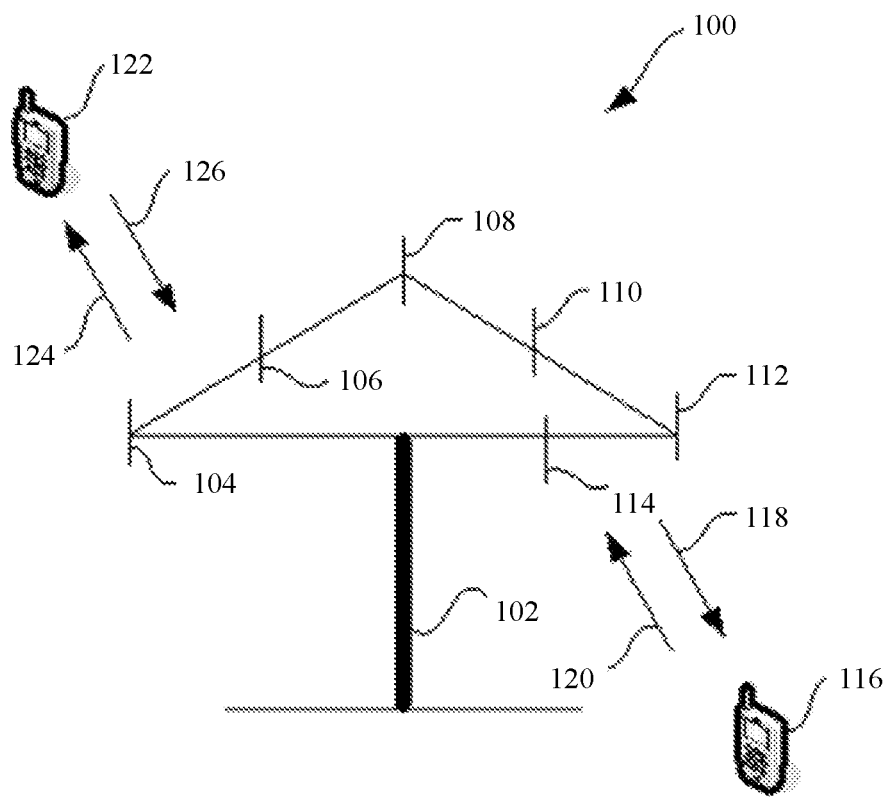
FIG. 3 is a schematic architectural diagram of a communications system according to an embodiment of the present invention.

FIG. 3 is a schematic architectural diagram of a communications system according to an embodiment of the present invention. Specifically, an example in which a network device is a base station is used. In FIG. 3, a base station 102 may include a plurality of antenna groups. Each antenna group may include one or more antennas. For example, one antenna group may include antennas 104 and 106, and another antenna group may include antennas 108 and 110. In addition, an additional group may be included, and the additional group may include antennas 112 and 114. Different antenna groups in high-frequency communication may be combined into different antenna panels (panel). For example, an antenna group forms a beam that points to a direction, and another antenna group forms another beam that points to another direction. More antennas may be required to adapt to different device capabilities. Therefore, different quantities of antennas may be disposed for the additional group based on different device capabilities. For example, two antennas are shown for each antenna group in FIG. 3. However, each group may have more or fewer antennas. The base station 102 may additionally include a transmitter chain and a receiver chain. A person of ordinary skill in the art may understand that the transmitter chain and the receiver chain each may include a plurality of components related to signal transmission and reception, for example, a processor, a modulator, a multiplexer, a demodulator, a demultiplexer, and an antenna.

The base station 102 may communicate with one or more terminal devices such as a terminal device 116 and a terminal device 122. However, it may be understood that the base station 102 may communicate with any quantity of terminal devices that are similar to the terminal device 116 or 122. As shown in FIG. 3, the terminal device 116 communicates with the antennas 112 and 114. The antennas 112 and 114 send information to the terminal device 116 by using a forward link 118, and receive information from the terminal device 116 by using a reverse link 120. In addition, the terminal device 122 communicates with the antennas 104 and 106. The antennas 104 and 106 send information to the terminal device 122 by using a forward link 124, and receive information from the terminal device 122 by using a reverse link 126. In a frequency division duplex (FDD) system, for example, the forward link 118 may use a frequency band different from that used by the reverse link 120, and the forward link 124 may use a frequency band different from that used by the reverse link 126. In addition, in a time division duplex (TDD) system, the forward link 118 and the reverse link 120 may use a same frequency band, and the forward link 124 and the reverse link 126 may use a same frequency band.

An area covered by each antenna group and/or a transmission coverage area that are/is designed for communication are/is referred to as a sector of the base station 102. For example, an antenna group may be designed to communicate with a terminal device in a sector in a coverage area of the base station 102. In a process in which the base station 102 respectively communicates with the terminal devices 116 and 122 by using the forward links 118 and 124, beamforming may be used on transmit antennas of the base station 102, to improve signal-to-noise ratios of the forward links 118 and 124. In addition, compared with a manner in which the base station uses a single antenna to send signals to all terminal devices that access the base station, the beamforming manner causes less interference to a mobile node in a neighboring cell when the base station 102 sends, through beamforming, signals to the terminal devices 116 and 122 that are randomly distributed in a related coverage area.

At a given time, the base station 102, the terminal device 116, or the terminal device 122 may be a wireless communications sending apparatus and/or a wireless communications receiving apparatus. When sending data, the wireless communications sending apparatus may encode the data for transmission. Specifically, the wireless communications sending apparatus may obtain, for example, generate, receive from another communications apparatus, or store in a memory, a specific quantity of data bits that need to be sent to the wireless communications receiving apparatus by using a channel. The data bits may be included in a transport block or a plurality of transport blocks of data, and the transport block may be segmented to generate a plurality of code blocks.

In LTE, a random access time t_id is a subframe index, and a value of t_id falls within [0, 9]. One radio frame (radio frame) includes 10 subframes (time). There are a maximum of six different sub-bands in terms of frequency, that is, f_id has six values [0, 5]. Therefore, a manner of calculating an RA-RNTI is a formula (1):

$$\text{RA-RNTI} = +t\_id + 10 \times f\_id \quad \text{formula (1)}$$

Therefore, the RA-RNTI has a maximum of 60 values.

Figure 1:
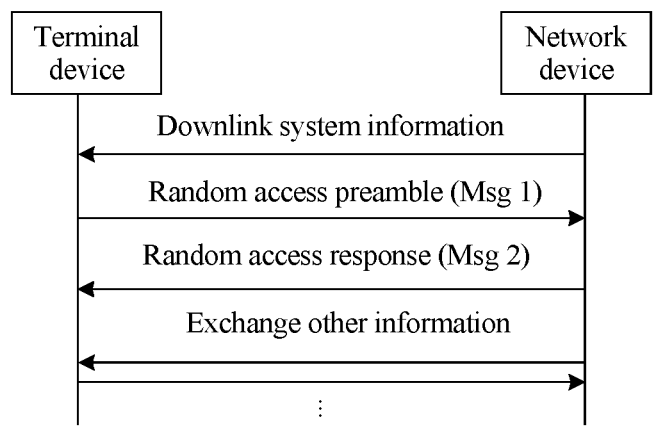
FIG. 1 is a schematic flowchart of a random access process and random access resource configuration in the current system.
Figure 2A:
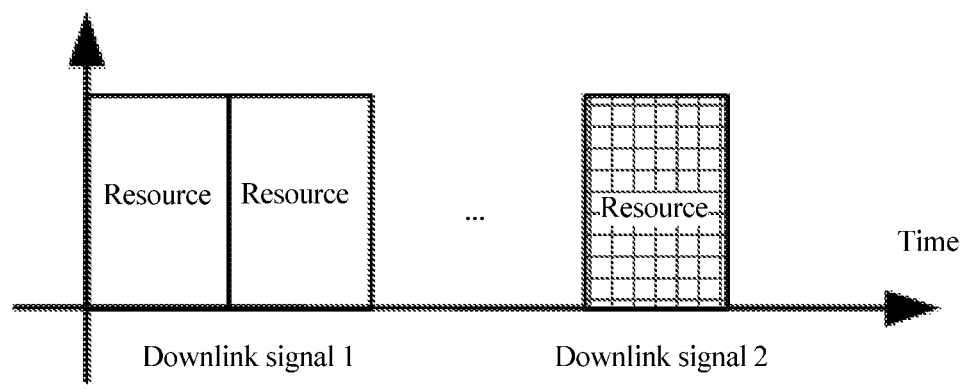
FIG. 2a is a schematic diagram in which different downlink signals are associated with different quantities of random access resources in terms of time.

Random access resource configuration shown in FIG. 2a is used as an example. A downlink signal 1 corresponds to two times that are denoted as t_id1 and t_id2 and that correspond to a same f_id.

In an existing LTE manner, a preamble detected on a resource corresponding to t_id1 is responded to by using a first message 2, and a preamble detected in the time t_id2 is responded to by using a second message 2. In addition, corresponding control information is separately scrambled by using the following identifiers:

$$\text{RA-RNTI1} = 1 + t\_id1 + 10 \times f\_id; \text{ and}$$

$$\text{RA-RNTI2} = 1 + t\_id2 + 10 \times f\_id.$$

The two resources correspond to a same downlink signal (transmit beam). This means that the two messages 2 may be sent by using a same downlink transmit beam. In this case, efficiency is relatively low regardless of whether the two messages 2 are used to make a response in a same time on different frequencies, or in different times.

The embodiments of the present invention provide a random access method, a random access response method, a terminal device, and a network device. A joint response is made to one or more random access preambles on a plurality of random access resources associated with one downlink signal or one downlink signal group, thereby saving communication resources and improving efficiency of a random access process.

In the embodiments of the present invention, a downlink signal may be a synchronization signal block (SS-block), and a downlink signal group may be an SS burst. In this case, that the network device groups a plurality of downlink signals means grouping a plurality of SS-blocks. One downlink signal group includes at least one SS-block, and the network device considers a plurality of downlink signal groups as one set. In this case, a downlink signal group may also be considered as a downlink synchronization signal burst (SS burst) group, and a set of downlink signal groups may be considered as a downlink synchronization signal burst set (SS burst set). A time may be one or more radio frames, subframes, mini-slots (mini-slot), slots (slot), orthogonal frequency division multiplexing (Orthogonal Frequency Division Multiplexing, OFDM) symbols, preamble formats, or preambles. An uplink signal may be a random access occasion (RACH occasion), a random access transmission occasion (RACH transmission occasion), or a random access preamble format (RACH preamble format). One uplink signal group corresponds to one or more radio frames, subframes, mini-slots, slots, OFDM symbols, preamble formats, or preambles. In the embodiments of the present invention, for example, an RA-RNTI is used to identify DCI, where "to identify" may also be understood as "to associate".

In all the following embodiments, mod(x, y) represents a modulo operation, and may also be denoted as x % y. If a maximum value of x is less than y, no modulo operation needs to be performed. If a value of y is 1, the item mod(x, y) does not participate in calculation.

In the embodiments of the present invention, the "RA-RNTI" may be referred to as an "NR RA-RNTI" or have another similar name in a next-generation network (NR). In the embodiments of the present invention, a function of the "RA-RNTI" is similar to that in LTE, and the "RA-RNTI" is used to identify at least one of a downlink signal, a downlink signal group, an uplink signal, an uplink signal group, a time resource, a frequency resource, a resource group, or a preamble group. On the network device side, the "RA-RNTI" is used to identify downlink control information on a physical downlink control channel (for example, a physical downlink control channel, PDCCH), and the downlink control information is used to indicate a resource location of a message 2 on a physical downlink shared channel (for example, PDSCH) and other encoding/decoding-related information. In the next-generation network, the "PDCCH" may be referred to as an "NR PDCCH", and the "PDSCH" may be referred to as an "NR PDSCH".

The terms "system" and "network" may be used interchangeably in the embodiments of the present invention. "A plurality of" means two or more than two. In view of this, "a plurality of" can be understood as "at least two" in the embodiments of the present invention. The term "and/or" describes an association relationship for describing associated objects and represents that three relationships may exist. For example, A and/or B may represent the following three cases: Only A exists, both A and B exist, and only B exists. In addition, the character "/" generally indicates an "or" relationship between the associated objects if there is no special description.

Figure 4:
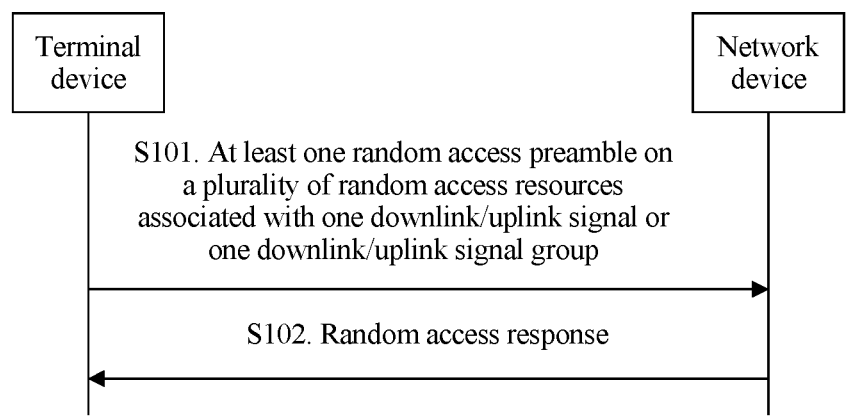
FIG. 4 is a schematic interaction diagram of a random access and response method according to an embodiment of the present invention.

FIG. 4 is a schematic interaction diagram of a random access and response method according to an embodiment of the present invention. The method may include the following steps.

Slot. Send, to a network device, at least one random access preamble on a plurality of random access resources associated with one downlink/uplink signal or one downlink/uplink signal group, where the plurality of random access resources correspond to one random access radio network temporary identifier.

Figure 5A:
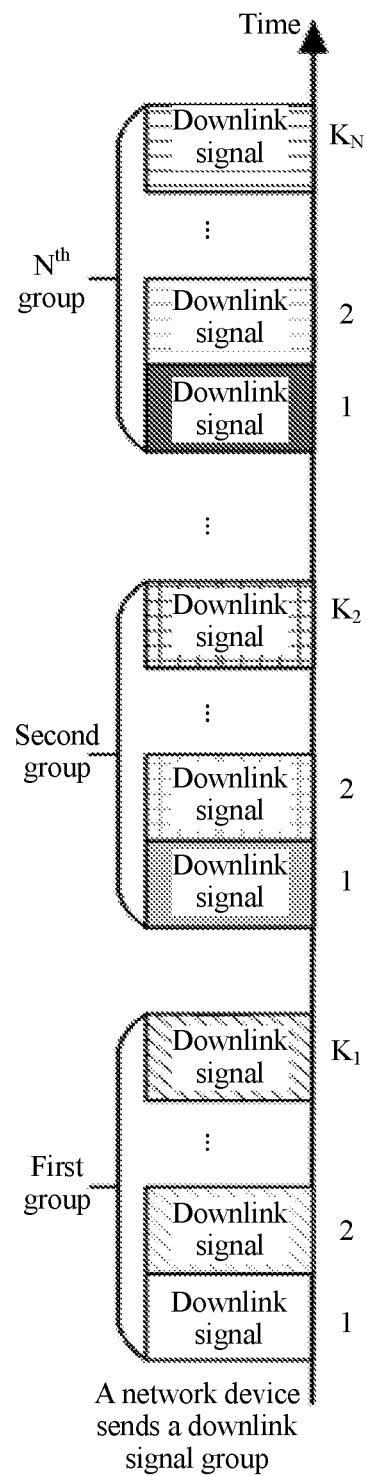
FIG. 5a is a schematic diagram of a downlink signal group sent by a network device.
Figure 5B:
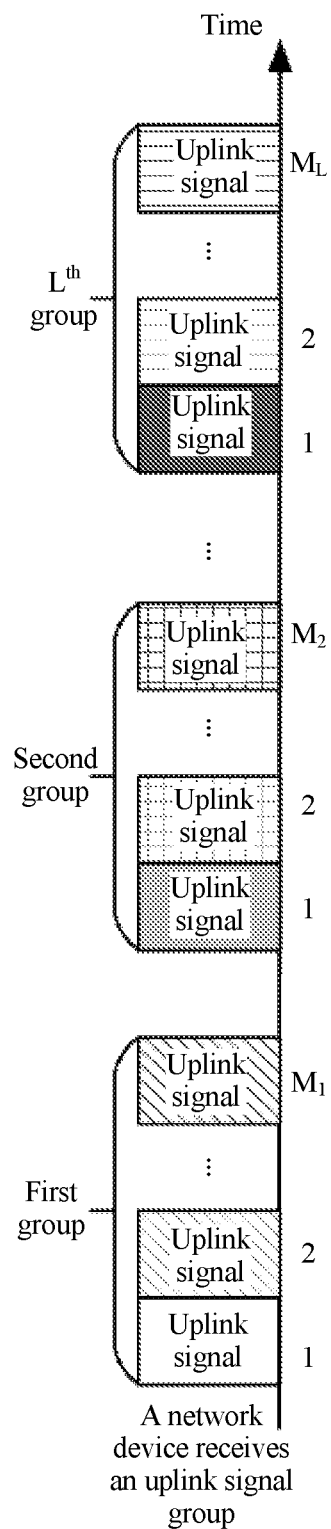
FIG. 5b is a schematic diagram of an uplink signal group received by a network device.

As shown in FIG. 5a that is a schematic diagram of a downlink signal group sent by a network device, in this embodiment of the present invention, a signal is carried on a specific resource for sending. The specific resource may be a "beam" mentioned above. To distinguish between different beams, in the following descriptions, a beam that carries a downlink signal sent by the network device is referred to as a downlink transmit beam of the network device or a transmit beam of the network device. Correspondingly, as shown in FIG. 5b that is a schematic diagram of an uplink signal group received by a network device, a beam that carries an uplink signal received by the network device may be referred to as an uplink receive beam of the network device or a receive beam of the network device.

There may be different quantities of user equipments in different downlink transmit beams. For example, in some downlink transmit beams, there is a large quantity of user equipments, and in some downlink transmit beams, there is a small quantity of user equipments. Therefore, for a downlink transmit beam in which a large quantity of user equipments exist, there is also a relatively large quantity of user equipments that simultaneously initiate random access. On the contrary, for a downlink transmit beam in which a relatively small quantity of user equipments exist, there is also a relatively small quantity of user equipments that simultaneously initiate random access. In this case, if all downlink transmit beams are associated with same random access resource configuration information, either random access resource configuration information associated with the downlink transmit beam in which a large quantity of user equipments exist is insufficient, or random access resource configuration information associated with the downlink transmit beam in which a small quantity of user equipments exist is excessive. Consequently, a resource waste is caused.

Therefore, in this embodiment of the present invention, random access resource configuration information associated with a plurality of downlink signals may be different. Herein, "be different" may mean that a part of the random access resource configuration information associated with the plurality of downlink signals is the same, and the remaining random access resource configuration information is different, or may mean that the random access resource configuration information associated with the plurality of downlink signals is totally different. If two pieces of random access resource configuration information are different, random access resources indicated by the two pieces of random access resource configuration information are different.

Figure 2B:
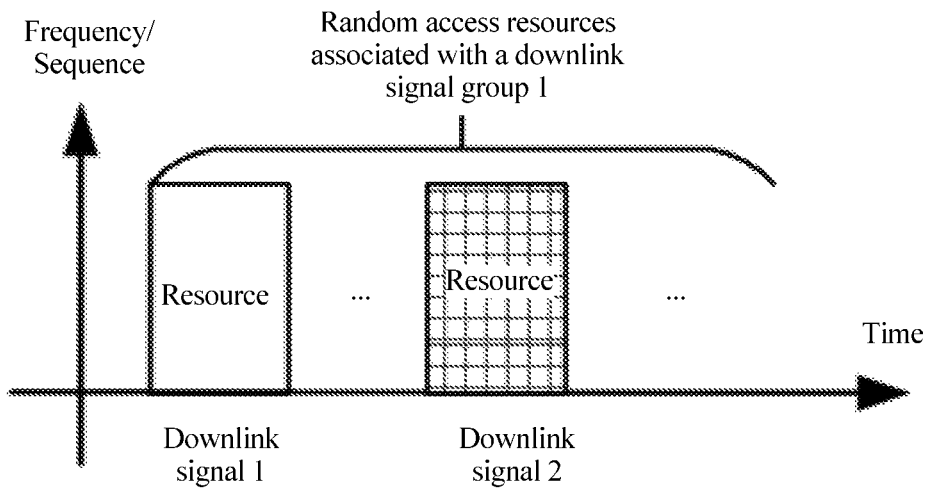
FIG. 2b is a schematic diagram in which one terminal device performs random access on random access resources associated with a plurality of downlink signals.
Figure 6A:
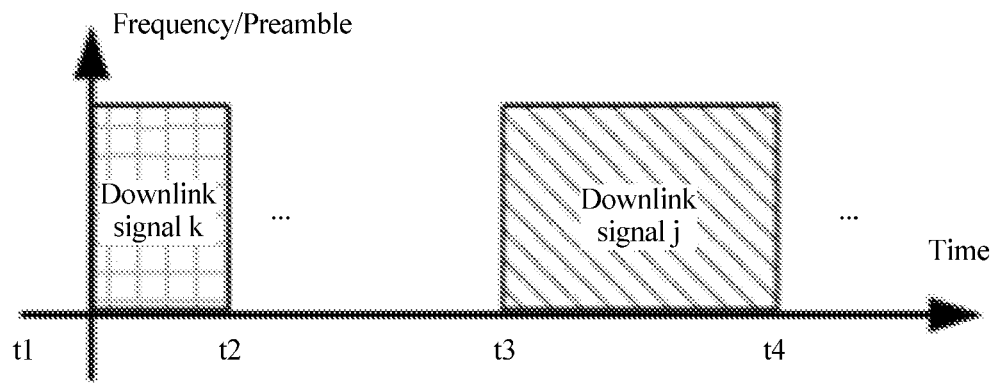
FIG. 6a to FIG. 6d are schematic diagrams of random access resource configuration.
Figure 6B:
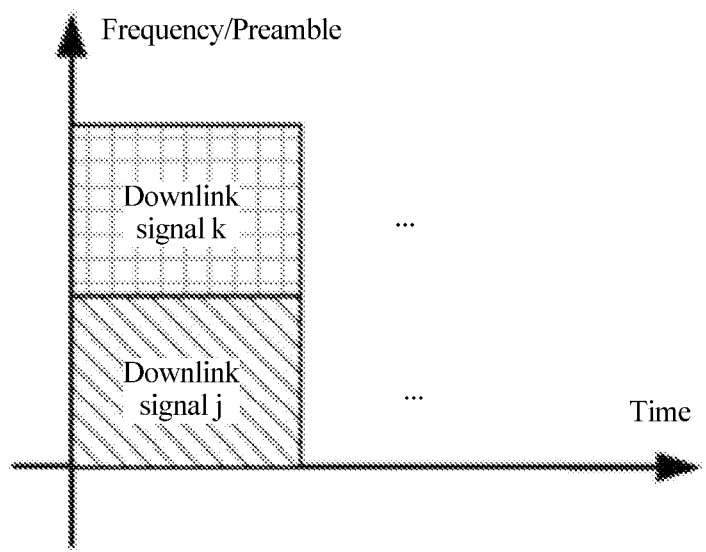
Figure 6C:
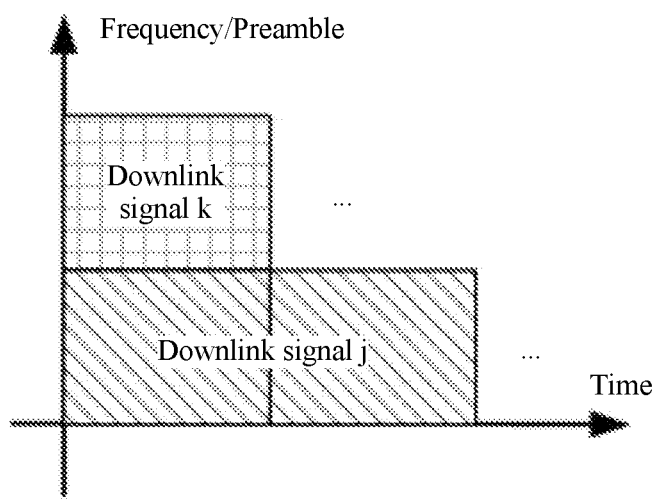
Figure 6D:
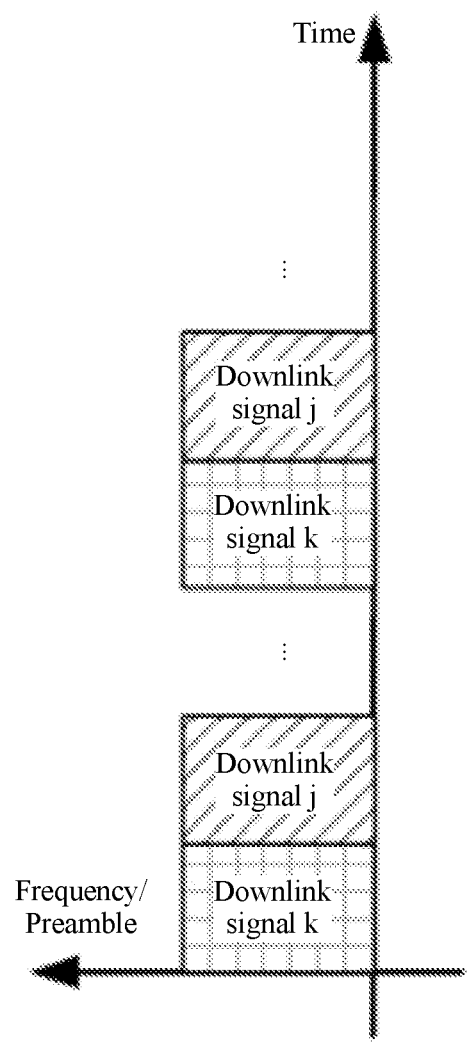

Specifically, one or more terminal devices may determine one or more random access preambles based on the plurality of random access resources associated with the downlink/uplink signal or the downlink/uplink signal group. Generally, one random access preamble may be sent on one random access time-frequency resource; or a plurality of random access preambles are sent on one random access time-frequency resource, and sequences in the preambles are different; or a plurality of preambles are sent on a plurality of random access time-frequency resources, and the preambles are located on different random access time-frequency resources. Random access resource configuration includes configuration of a time, a frequency, and a random access preamble sequence. The plurality of random access resources may be different in the time, the frequency, or the random access preamble sequence, or may be different in two features thereof, or may be different in all the three features. It should be noted that, if the plurality of random access resources are consecutive in terms of time, the plurality of random access resources may be considered as one random access resource. Certainly, the plurality of random access resources may be discrete in terms of time. FIG. 6a to FIG. 6d are schematic diagrams of random access resource configuration. In FIG. 6a, random access resources associated with a transmit beam k and a transmit beam j are different in terms of time. In FIG. 6b, random access resources associated with different beams are the same in terms of time and frequency, but a half preamble is associated with a downlink signal k, and a half preamble is associated with a downlink signal j. In FIG. 6c, there is an intersection between random access resources associated with different beams in terms of time, but the random access resources are separated from each other in terms of frequency/preamble, for example, on a same frequency-time resource, a half preamble above is associated with a downlink signal k, and a half preamble below is associated with a downlink signal j. In FIG. 6d, different beams are associated with a plurality of random access resources that are separated from each other in terms of time. Specifically, when a random access preamble is sent, the following two cases exist: As shown in FIG. 2a that is a schematic diagram in which different downlink signals are associated with different quantities of random access resources in terms of time, the plurality of random access resources are different in terms of time (certainly, may be different in terms of frequency or preamble sequence), and a plurality of terminal devices may send a plurality of random access preambles to the network device on the plurality of random access resources that are different in terms of time. As shown in FIG. 2b that is a schematic diagram in which one terminal device performs random access on random access resources associated with a plurality of downlink signals, the plurality of random access resources are also different in terms of time. However, one terminal device sends a plurality of random access preambles to the network device on the plurality of random access resources. The downlink signal or the downlink signal group may be a downlink transmit beam that has relatively good receive quality and that is determined by one or more terminal devices through beam sweeping during downlink synchronization.

The random access radio network temporary identifier is, for example, an RA-RNTI in this embodiment. In this embodiment, the terminal device and the network device correspond to one RA-RNTI on a plurality of random access resources. The RA-RNTI may be negotiated by the terminal device with the network device in advance, or may be negotiated before the terminal device sends the random access preamble. Therefore, the method may further include the following step: negotiating with the network device to determine the random access radio network temporary identifier.

The network device receives the one or more random access preambles sent by the one or more terminal devices.

S102. Send a random access response to the at least one terminal device, where the random access response is a response to the at least one random access preamble.

The network device detects a received signal, and if detecting that a random access preamble (where the random access preamble may be a preamble sequence) or some sequences in the preamble (where the random access preamble is repetition of a plurality of sequences or one sequence), the network device generates a random access response (also referred to as a message 2 (MSG 2)) corresponding to the preamble sequence. The random access response is carried on a physical downlink shared channel (Physical downlink shared channel, PDSCH), and downlink control information (Downlink Control Information, DCI) corresponding to the channel is identified by using an RA-RNTI. The DCI is carried on a physical downlink control channel (Physical downlink control channel, PDCCH), and the DCI is used to indicate a frequency and demodulation information of the random access response. If the DCI is scrambled by using the RA-RNTI, the terminal device may determine that the DCI is used for the random access response.

In this embodiment, the network device makes a joint response to the one or more random access preambles, and DCI corresponding to the random access response is scrambled by using one RA-RNTI. For example, in a random access process shown in FIG. 2a and FIG. 2b, preambles or preamble sequences that are detected in two times are responded to by using one random access response, and correspondingly, a same RA-RNTI is used for identification.

After sending a random access preamble, the terminal device needs to wait for receiving a random access response from the network device. Specifically, in a time window specified by the downlink control information of the network device, the terminal device listens on the physical downlink control channel by using a corresponding RA-RNTI. If receiving DCI identified by using the RA-RNTI, the terminal device decodes a random access response at a time-frequency location indicated by the physical downlink control channel, that is, receives the random access response, and then proceeds to a subsequent process. The physical downlink control channel may include a plurality of pieces of DCI, and specific DCI corresponding to the random access response needs to be found. In this case, the terminal device descrambles the decoded DCI by using the RA-RNTI, and if the descrambling succeeds, the terminal device considers that the current DCI corresponds to the random access response, and correspondingly, receives the random access response.

Because the network device makes a joint response to one or more random access preambles, that is, one random access response may be a response to a plurality of random access preambles, the terminal device may obtain, from the random access response based on a preamble of the terminal device, a response to the random access preamble transmitted by the terminal device.

Further, the following describes a manner of determining the random access radio network temporary identifier.

In an implementation, the random access radio network temporary identifier may be determined by using a parameter combination of an index number of the downlink/uplink signal and a first specified constant. Further, the random access radio network temporary identifier may be determined by using an initial value of the random access radio network temporary identifier, the index number of the downlink/uplink signal, and the first specified constant. The first specified constant is any integer between 1 and 64 (including 1 and 64).

To be specific, the RA-RNTI may be a function of an index of a downlink/uplink signal.

Specifically, if the index of the downlink/uplink signal is blk_id, a formula for calculating the RA-RNTI is a formula (2):

$$\text{RA-RNTI} = \text{RNTI\_0} + \text{mod}(blk\_id, K) \quad \text{formula (2)}$$

K is equal to any one of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, and 64. RNTI_0≥1, and RNTI_0 is a positive integer and is the initial value of the temporary identifier. For example, if RNTI_0=1, it indicates that the temporary identifier is numbered starting from 1. For another example, if RNTI_0=61, it indicates that the temporary identifier is numbered starting from 61. RNTI_0 or K may be specified based on system information, fixed, or obtained by searching a table. The RA-RNTI is used to identify a random access time-frequency resource associated with the downlink/uplink signal blk_id.

In another implementation, the random access radio network temporary identifier may be determined by using a parameter combination of an index number of the downlink/uplink signal group and a second specified constant. Further, the random access radio network temporary identifier may be determined by using an initial value of the random access radio network temporary identifier, the index number of the downlink/uplink signal group, and the second specified constant. The second specified constant is any integer between 1 and 32 (including 1 and 32).

To be specific, the RA-RNTI may be a function of an index of a downlink/uplink signal group.

Specifically, if the index of the downlink/uplink signal group is bst_id, a formula for calculating the RA-RNTI is a formula (3):

$$\text{RA-RNTI} = \text{RNTI\_0} + \text{mod}(bst\_id, N) \quad \text{formula (3)}$$

N is equal to any one of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, and 32. RNTI_0≥1, and RNTI_0 is a positive integer and is the initial value of the temporary identifier. For example, if RNTI_0=1, it indicates that the temporary identifier is numbered starting from 1. For another example, if RNTI_0=61, it indicates that the temporary identifier is numbered starting from 61. RNTI_0 or N may be specified based on system information, fixed, or obtained by searching a table. The RA-RNTI is used to identify a random access time-frequency resource associated with each signal in the downlink/uplink signal group bst_id.

In still another implementation, the random access radio network temporary identifier may be determined by using a parameter combination of an index number of the downlink/uplink signal, a first specified constant, an index number of the downlink/uplink signal group, and a second specified constant. Further, the random access radio network temporary identifier may be determined by using an initial value of the random access radio network temporary identifier, the index number of the downlink/uplink signal, the first specified constant, the index number of the downlink/uplink signal group, and the second specified constant. The first specified constant is any integer between 1 and 64 (including 1 and 64), and the second specified constant is any integer between 1 and 32 (including 1 and 32).

To be specific, the RA-RNTI may be a function of an index of a signal and an index of a signal group.

Specifically, if the index of the downlink/uplink signal is blk_id and the index of the downlink/uplink signal group is bst_id, a formula for calculating the RA-RNTI is a formula (4):

$$RA\text{-}RNTI = RNTI\_0 + \mathrm{mod}(blk\_id, K) + K \times \mathrm{mod}(bst\_id, N) \quad \text{formula (4)}$$

K is equal to any one of 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, and 64. N is equal to any one of 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, and 32. RNTI_0≥1, and RNTI_0 is a positive integer and is the initial value of the temporary identifier. For example, if RNTI_0=1, it indicates that the temporary identifier is numbered starting from 1. For another example, if RNTI_0=61, it indicates that the temporary identifier is numbered starting from 61. RNTI_0, K, or N may be specified based on system information, fixed, or obtained by searching a table. The RA-RNTI is used to identify a random access time-frequency resource associated with the signal blk_id in the signal group bst_id. The signal and the signal group may be respectively an uplink signal and an uplink signal group, or may be respectively a downlink signal and a downlink signal group.

In still another implementation, the random access radio network temporary identifier may be determined by using a parameter combination of an index number of the downlink/uplink signal, a first specified constant, an index number of the downlink/uplink signal group, a second specified constant, an index number of a signal time, and a third specified constant. Further, the random access radio network temporary identifier may be determined by using an initial value of the random access radio network temporary identifier, the index number of the downlink/uplink signal, the first specified constant, the index number of the downlink/uplink signal group, the second specified constant, the index number of the signal time, and the third specified constant. The first specified constant is any integer between 1 and 64 (including 1 and 64), the second specified constant is any integer between 1 and 32 (including 1 and 32), and the third specified constant is any integer between 2 and 20 (including 2 and 20).

To be specific, the RA-RNTI may be a function of an index of a signal time, an index of a signal, and an index of a signal group.

Specifically, if the index of the downlink/uplink signal is blk_id, the index of the downlink/uplink signal group is bst_id, and the index of the signal time is t_id, a formula for calculating the RA-RNTI is a formula (5):

$$RA\text{-}RNTI = RNTI\_0 + \mathrm{mod}(blk\_id, K) + K \times \mathrm{mod}(bst\_id, N) + K \times N \times \mathrm{mod}(t\_id, T) \quad \text{formula (5)}$$

K is equal to any one of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, and 64. N is equal to any one of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, and 32. T is equal to any one of 2, 3, 4, 5, 6, 7, 8, 9, 10, 11, 12, 13, 14, 15, 16, 17, 18, 19, and 20. RNTI_0≥1, and RNTI_0 is a positive integer and is the initial value of the temporary identifier. For example, if RNTI_0=1, it indicates that the temporary identifier is numbered starting from 1. For another example, if RNTI_0=61, it indicates that the temporary identifier is numbered starting from 61. RNTI_0, K, N, or T may be specified based on system information, fixed, or obtained by searching a table. The RA-RNTI is used to identify a random access time-frequency resource associated with the downlink/uplink signal blk_id in the downlink/uplink signal group bst_id. The signal and the signal group may be respectively an uplink signal and an uplink signal group, or may be respectively a downlink signal and a downlink signal group.

In still another possible implementation, when K or N is 1, a corresponding item mod(blk_id, K) or mod(bst_id, N) is not used for calculating the RA-RNTI.

A time index may be a number of a radio frame, a subframe, a mini-slot, a slot, an OFDM symbol, or a preamble.

In still another implementation, the random access radio network temporary identifier may be determined by using a parameter combination of an index number of the downlink/uplink signal, a first specified constant, an index number of the downlink/uplink signal group, a second specified constant, an index number of a signal time, a third specified constant, an index value of a frequency signal, and a fourth specified constant. Further, the random access radio network temporary identifier may be determined by using an initial value of the random access radio network temporary identifier, the index number of the downlink/uplink signal, the first specified constant, the index number of the downlink/uplink signal group, the second specified constant, the index number of the signal time, the third specified constant, the index value of the frequency signal, and the fourth specified constant. The first specified constant is any integer between 1 and 64 (including 1 and 64), the second specified constant is any integer between 1 and 32 (including 1 and 32), the third specified constant is any integer between 2 and 20 (including 2 and 20), and the fourth specified constant is any integer between 2 and 20 (including 2 and 20).

To be specific, the RA-RNTI may be a function of an index of a signal time, an index of a signal frequency, an index of a downlink/uplink signal, and an index of a downlink/uplink signal group.

Specifically, if the index of the downlink/uplink signal is blk_id, the index of the downlink/uplink signal group is bst_id, the index of the signal time is t_id, and the index of the signal frequency is f_id, a formula for calculating the RA-RNTI is a formula (6):

$$\text{RA-RNTI} = \text{RNTI\_0} + \text{mod}(blk\_id, K) + K \times \text{mod}(bst\_id, N) + K \times N \times \text{mod}(t\_id, T) + K \times N \times T \times \text{mod}(f\_id, F) \quad \text{formula (6)}$$

K is equal to any one of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, and 64. N is equal to any one of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, and 32. T is equal to any one of 2, 3, 4, 5, 6, 7, 8, 9, 10, 11, 12, 13, 14, 15, 16, 17, 18, 19, and 20. F is equal to any one of 2, 3, 4, 5, 6, 7, 8, 9, 10, 11, 12, 13, 14, 15, 16, 17, 18, 19, and 20. RNTI_0≥1, and RNTI_0 is a positive integer and is the initial value of the temporary identifier. For example, if RNTI_0=1, it indicates that the temporary identifier is numbered starting from 1. For another example, if RNTI_0=61, it indicates that the temporary identifier is numbered starting from 61. RNTI_0, K, N, T, or F may be specified based on system information, fixed, or obtained by searching a table. The RA-RNTI is used to identify a random access time-frequency resource associated with the downlink/uplink signal blk_id in the downlink/uplink signal group bst_id.

In still another possible implementation, when K or N is 1, a corresponding item mod(blk_id, K) or mod(bst_id, N) is not used for calculating the RA-RNTI.

A time index may be a number of a radio frame, a subframe, a mini-slot, a slot, an OFDM symbol, or a preamble.

In still another implementation, before the terminal device performs Slot and the network device performs S102, the method may further include: selecting, based on a group to which the plurality of random access resources belong or a group to which the at least one random access preamble belongs, a parameter combination for determining the random access radio network temporary identifier.

Specifically, in this embodiment, random access resources and/or preambles associated with a downlink signal are grouped. For example, a first group is used to indicate that the terminal device sends only one random access signal before the random access response is made, and the second group is used to indicate that the terminal device sends a plurality of random access signals before the random access response is made. The random access signals are located on random access resources associated with a plurality of different downlink signals. A manner of calculating the RA-RNTI is as follows:

$$\begin{cases} RNTI_0 + \text{mod}(blk_{id}, K), \text{ a random access resource is in the first group} \\ RNTI_1 + \text{mod}(bst_{id}, N), \text{ a random access} \\ \quad \text{resource is in the second group} \end{cases}$$

An index of the downlink/uplink signal is blk_id, and an index of the downlink/uplink signal group is bst_id. K is equal to any one of 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, and 64. N is equal to any one of 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, and 32. RNTI_0≥1, and RNTI_0 is a positive integer and is an initial value of a temporary identifier in a temporary identifier calculation formula corresponding to the first group. For example, if RNTI_0=1, it indicates that the temporary identifier is numbered starting from 1. For another example, if RNTI_0=61, it indicates that the temporary identifier is numbered starting from 61. RNTI_1≥RNTI_0+K+1, and RNTI_1 is a positive integer and is an initial value of a temporary identifier in a temporary identifier calculation formula corresponding to the second group. RNTI_0, RNTI_1, K, or N may be specified based on system information, fixed, or obtained by searching a table.

In another embodiment, any two or more of the foregoing embodiments may be combined. For example, different combinations correspond to different random access resource groups and/or preamble groups. For example, in the foregoing example, if a random access preamble is in the first group, the RA-RNTI may be determined by using the formula (2); or if a random access preamble is in the second group, the RA-RNTI may be determined by using the formulas (3) to (6).

In still another possible implementation, in all the foregoing embodiments, when the random access radio network temporary identifier is calculated, locations of any two of blk_id, bst_id, t_id, and f_id may be exchanged, and correspondingly, locations of K, N, T, and F need to be exchanged.

In still another possible implementation, the first specified constant, the second specified constant, the third specified constant, the fourth specified constant, and RNTI_0 are determined based on system information, or are fixed values.

Values of RNTI_0, the first specified constant, the second specified constant, the third specified constant, and the fourth specified constant ensure that within a same time, different random access is different from each other, and random access and another signal/channel are different from each other.

In the foregoing implementations, a plurality of manners of determining the random access radio network temporary identifier are described. Because a plurality of random access resources associated with one downlink signal or one downlink signal group correspond to one random access radio network temporary identifier, the random access radio network temporary identifier is related to an uplink/downlink signal or an uplink/downlink signal group, and a signal time and a signal frequency for sending an uplink/downlink signal.

According to the random access and response method provided in this embodiment of the present invention, a joint response is made to one or more random access preambles on random access resources associated with one downlink signal or one downlink signal group, thereby saving communication resources and improving efficiency of a random access process.

The foregoing describes in detail the method in the embodiments of the present invention. The following provides an apparatus in the embodiments of the present invention.

Figure 7:
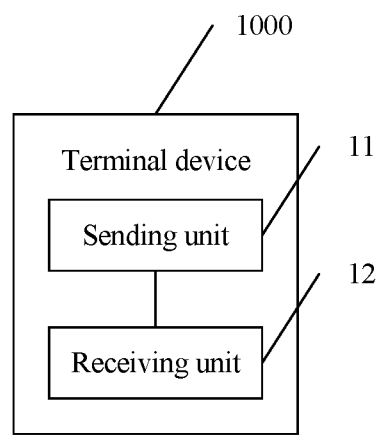
FIG. 7 is a schematic module diagram of a terminal device according to an embodiment of the present invention.

FIG. 7 is a schematic module diagram of a terminal device 1000 according to an embodiment of the present invention. The terminal device 1000 may include a sending unit 11 and a receiving unit 12.

The sending unit 11 may perform uplink communication with a network device, for example, perform S101 to send, to the network device, at least one random access preamble on a plurality of random access resources associated with one downlink/uplink signal or one downlink/uplink signal group.

The receiving unit 12 may perform downlink communication with the network device, for example, perform S102 to receive a random access response from the network device.

For specific implementation of the foregoing modules, refer to the descriptions in the foregoing method embodiments. Details are not described herein again.

According to the terminal device provided in this embodiment of the present invention, one or more random access preambles on random access resources associated with one downlink signal or one downlink signal group are sent to the network device, so that the network device can make a joint response to the one or more random access preambles on the random access resources associated with the downlink signal or the downlink signal group, thereby saving communication resources and improving efficiency of a random access process.

Figure 8:
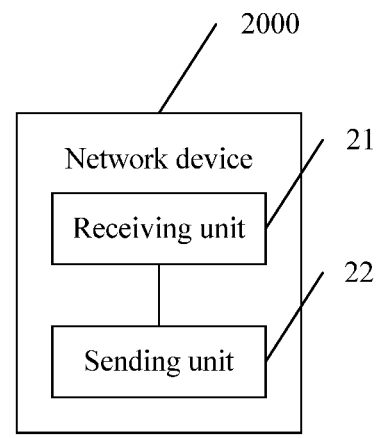
FIG. 8 is a schematic module diagram of a network device according to an embodiment of the present invention.

FIG. 8 is a schematic module diagram of a network device 2000 according to an embodiment of the present invention. The network device 2000 may include a receiving unit 21 and a sending unit 22.

The receiving unit 21 may perform uplink communication with a terminal device, for example, perform S101 to receive, from at least one terminal device, at least one random access preamble on a plurality of random access resources associated with one downlink/uplink signal or one downlink/uplink signal group.

The sending unit 22 may perform downlink communication with the terminal device, for example, perform S102 to send a random access response to the at least one terminal device.

According to the network device provided in this embodiment of the present invention, the network device can make a joint response to one or more random access preambles on random access resources associated with one downlink signal or one downlink signal group, thereby saving communication resources and improving efficiency of a random access process.

Figure 9:
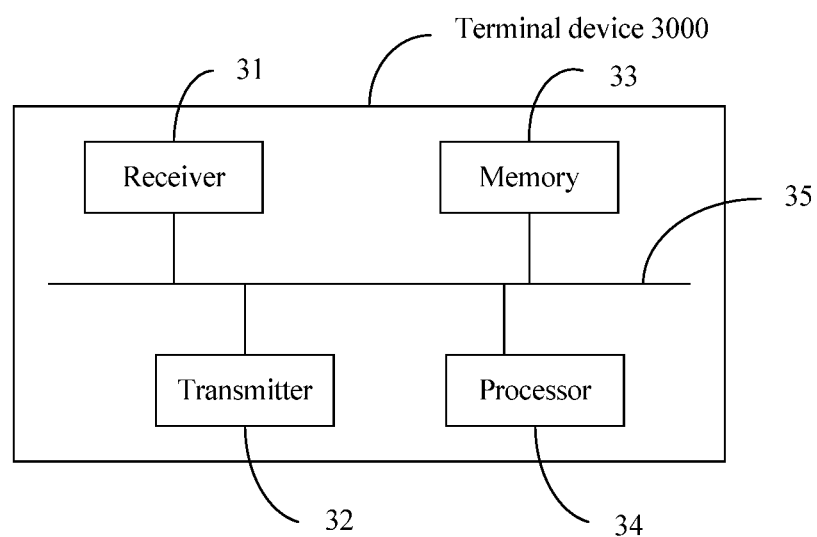
FIG. 9 is a structural diagram of hardware of a terminal device according to an embodiment of the present invention.

FIG. 9 is a structural diagram of hardware of a terminal device 3000 according to an embodiment of the present invention. The terminal device 3000 may include a receiver 31, a transmitter 32, a memory 33, and a processor 34. The receiver 31, the transmitter 32, the memory 33, and the processor 34 are connected to each other by using a bus 35. A related function implemented by the receiving unit 12 in FIG. 7 may be implemented by the receiver 31, and a related function implemented by the sending unit 11 may be implemented by the transmitter 32.

The memory 33 includes but is not limited to a random access memory (Random Access Memory, RAM), a read-only memory (Read-Only Memory, ROM), an erasable programmable read only memory (Erasable Programmable Read Only Memory, EPROM), or a compact disc read-only memory (Compact Disc Read-Only Memory, CD-ROM). The memory 33 is configured to store a related instruction and related data. The memory 33 may be an external component, or may be built into the processor 34.

The receiver 31 is configured to receive data and/or a signal, and the transmitter 32 is configured to send data and/or a signal. The transmitter and the receiver may be independent components, or may be an integral component.

The processor 34 may include one or more processors, for example, include one or more central processing units (CPU). When the processor 34 is one CPU, the CPU may be a single-core CPU, or may be a multi-core CPU.

The memory 33 is configured to store program code and data of the terminal device.

The transmitter 32 is configured to perform uplink communication with a network device, for example, perform S101 to send, to the network device, at least one random access preamble on a plurality of random access resources associated with one downlink/uplink signal or one downlink/uplink signal group.

The receiver 31 is configured to perform downlink communication with the network device, for example, perform S102 to receive a random access response from the network device. For details, refer to the descriptions in the method embodiments. Details are not described herein again.

It may be understood that FIG. 9 shows only a simplified design of the terminal device. In actual application, the terminal device may further include other necessary elements, including but not limited to any quantity of transceivers, processors, controllers, memories, and the like, and all terminal devices that can implement embodiments of the present invention fall within the protection scope of the present invention. The foregoing processor and memory may alternatively be an integrated chip in the terminal device.

According to the terminal device provided in this embodiment of the present invention, one or more random access preambles on random access resources associated with one downlink signal or one downlink signal group are sent to the network device, so that the network device can make a joint response to the one or more random access preambles on the random access resources associated with the downlink signal or the downlink signal group, thereby saving communication resources and improving efficiency of a random access process.

Figure 10:
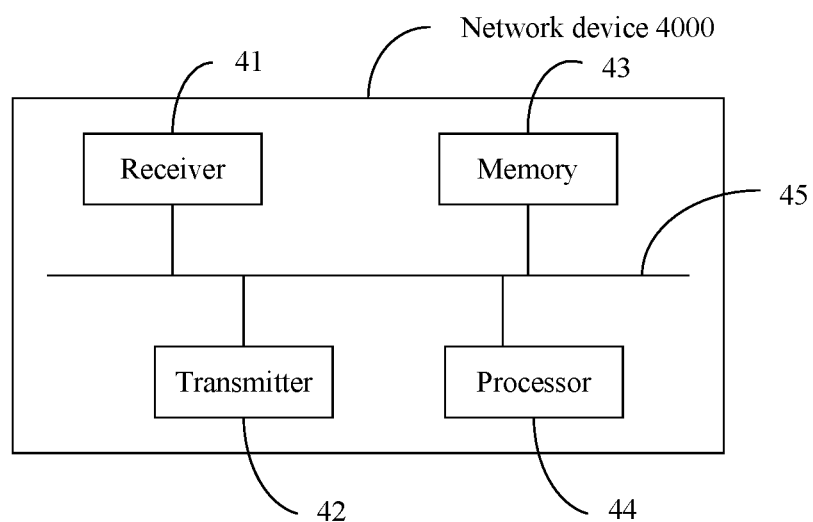
FIG. 10 is a structural diagram of hardware of a network device according to an embodiment of the present invention

FIG. 10 is a structural diagram of hardware of a network device 4000 according to an embodiment of the present invention. The network device 4000 may include a receiver 41, a transmitter 42, a memory 43, and a processor 44. The receiver 41, the transmitter 42, the memory 43, and the processor 44 are connected to each other by using a bus 45. A related function implemented by the sending unit 22 in FIG. 8 may be implemented by the transmitter 42, and a related function implemented by the receiving unit 21 may be implemented by the receiver 41.

The memory 43 includes but is not limited to a RAM, a ROM, an EPROM, or a CD-ROM. The memory 43 is configured to store a related instruction and related data. The memory 43 may be an external component, or may be built into the processor 44.

The receiver 41 is configured to receive data and/or a signal, and the transmitter 42 is configured to send data and/or a signal. The transmitter and the receiver may be independent components, or may be an integral component.

The processor 44 may include one or more processors, for example, include one or more CPUs. When the processor 44 is one CPU, the CPU may be a single-core CPU, or may be a multi-core CPU.

The memory 43 is configured to store program code and data of the network device.

The receiver 41 is configured to perform uplink communication with a terminal device, for example, perform S101 to receive, from at least one terminal device, at least one random access preamble on a plurality of random access resources associated with one downlink/uplink signal or one downlink/uplink signal group.

The transmitter 42 is configured to perform downlink communication with the terminal device, for example, perform S102 to send a random access response to the at least one terminal device.

For details, refer to the descriptions in the method embodiments. Details are not described herein again.

It may be understood that FIG. 10 shows only a simplified design of the network device. In actual application, the network device may further include other necessary elements, including but not limited to any quantity of transceivers, processors, controllers, memories, and the like, and all network devices that can implement embodiments of the present invention fall within the protection scope of the present invention. The foregoing processor and memory may alternatively be an integrated chip in the network device.

According to the network device provided in this embodiment of the present invention, the network device can make a joint response to one or more random access preambles on random access resources associated with one downlink signal or one downlink signal group, thereby saving communication resources and improving efficiency of a random access process.

Still another aspect of this application provides a computer readable storage medium. The computer readable storage medium stores an instruction. When the instruction is run on a computer, the computer is enabled to perform the methods in the foregoing aspects.

Still another aspect of this application provides a computer program product that includes an instruction. When the computer program product is run on a computer, the computer is enabled to perform the methods in the foregoing aspects.

A person of ordinary skill in the art may be aware that, with reference to examples of units and algorithm steps described in the embodiments disclosed in this specification, the embodiments may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units may be integrated into one unit.

The foregoing embodiments may be all or partially implemented by using software, hardware, firmware, or any combination thereof. When software is used to implement the embodiments, the embodiments may be all or partially implemented in a form of a computer program product. The computer program product includes one or more computer instructions. When the computer program instructions are loaded and executed on the computer, all or some of the processes or functions according to the embodiments of the present invention are generated. The computer may be a general-purpose computer, a special-purpose computer, a computer network, or other programmable apparatuses. The computer instruction may be stored in a computer readable storage medium, or may be transmitted by using the computer readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (Solid State Disk, SSD)), or the like.

A person of ordinary skill in the art may understand that all or some of the processes of the methods in the embodiments may be implemented by a computer program instructing related hardware. The program may be stored in a computer readable storage medium. When the program runs, the processes of the methods in the embodiments are performed. The foregoing storage medium includes: any medium that can store program code, such as a ROM, a random access memory RAM, a magnetic disk, or an optical disc.

What is claimed is:

1. A method, comprising:
sending, by a terminal device, a random access preamble in a random access occasion to a network device, wherein the random access occasion belongs to a random access occasion group, and the random access occasion group is associated with a plurality of synchronization signal blocks; and
receiving, by the terminal device, a random access response from the network device according to a random access radio network temporary identifier (RA-RNTI), wherein the RA-RNTI is determined based on the random access occasion group and a slot index of the random access occasion, and the slot index of the random access occasion is determined according to the random access occasion group.

2. The method according to claim 1, wherein the random access occasion of the random access preamble is one of random access occasions that is associated with a synchronization signal block.

3. The method according to claim 1, wherein the RA-RNTI further corresponds to a first specified constant, a second specified constant, a third specified constant, or a fourth specified constant.

4. The method according to claim 3, wherein the first specified constant is an integer between 1 and 64, the second specified constant is an integer between 1 and 32, the third specified constant is an integer between 2 and 20, and the fourth specified constant is an integer between 2 and 20.

5. The method according to claim 1, the RA-RNTI is further related to an initial RA-RNTI value, and the initial RA-RNTI value is determined based on the random access occasion group.

6. A method, comprising:
receiving, by a network device, a random access preamble in a random access occasion from a terminal device; and
sending, by the network device, a random access response to the terminal device, wherein the random access response is carried by a physical downlink shared channel (PDSCH), downlink control information (DCI) corresponding to the PDSCH is scrambled with a random access radio network temporary identifier (RA-RNTI), the RA-RNTI is determined based on a random access occasion group and a slot index of the random access occasion, the random access occasion belongs to the random access occasion group, the random access occasion group is associated with a plurality of synchronization signal blocks, and the slot index of the random access occasion is determined according to the random access occasion group.

7. The method according to claim 6, wherein the random access occasion of the random access preamble is one of random access occasions that is associated with a synchronization signal block.

8. The method according to claim 6, wherein the RA-RNTI further corresponds to a first specified constant, a second specified constant, a third specified constant, or a fourth specified constant.

9. The method according to claim 8, wherein the first specified constant is an integer between 1 and 64, the second specified constant is an integer between 1 and 32, the third specified constant is an integer between 2 and 20, and the fourth specified constant is an integer between 2 and 20.

10. The method according to claim 6, the RA-RNTI is further related to an initial RA-RNTI value, and the initial RA-RNTI value is determined based on the random access occasion group.

11. A device, comprising:
a transmitter, configured to send a random access preamble in a random access occasion to a network device, wherein the random access occasion belongs to a random access occasion group, and the random access occasion group is associated with a plurality of synchronization signal blocks; and
a receiver, configured to receive a random access response from the network device according to a random access radio network temporary identifier (RA-RNTI), wherein the RA-RNTI is determined based on the random access occasion group and a slot index of the random access occasion, and the slot index of the random access occasion is determined according to the random access occasion group.

12. The device according to claim 11, wherein the random access occasion of the random access preamble is one of random access occasions that is associated with a synchronization signal block.

13. The device according to claim 11, wherein the RA-RNTI further corresponds to a first specified constant, a second specified constant, a third specified constant, or a fourth specified constant.

14. The device according to claim 11, wherein the first specified constant is an integer between 1 and 64, the second specified constant is an integer between 1 and 32, the third specified constant is an integer between 2 and 20, and the fourth specified constant is an integer between 2 and 20.

15. The device according to claim 11, the RA-RNTI is further related to an initial RA-RNTI value, and the initial RA-RNTI value is determined based on the random access occasion group.

16. A device, comprising:
a receiver, configured to receive a random access preamble in a random access occasion from a terminal device; and
a transmitter, configured to send a random access response to the terminal device, wherein the random access response is carried by a physical downlink shared channel (PDSCH), downlink control information (DCI), corresponding to the PDSCH is scrambled with a random access radio network temporary identifier (RA-RNTI), the RA-RNTI is determined based on a random access occasion group and a slot index of the random access occasion, the random access occasion belongs to the random access occasion group, the random access occasion group is associated with a plurality of synchronization signal blocks, and the slot index of the random access occasion is determined according to the random access occasion group.

17. The device according to claim 16, wherein the random access occasion of the random access preamble is one of random access occasions that is associated with a synchronization signal block.

18. The device according to claim 16, wherein the RA-RNTI further corresponds to a first specified constant, a second specified constant, a third specified constant, or a fourth specified constant.

19. The device according to claim 18, wherein the first specified constant is an integer between 1 and 64, the second specified constant is an integer between 1 and 32, the third specified constant is an integer between 2 and 20, and the fourth specified constant is an integer between 2 and 20.

20. The device according to claim 16, the RA-RNTI is further related to an initial RA-RNTI value, and the initial RA-RNTI value is determined based on the random access occasion group.

* * * * *